United States Patent
Nakatsuji (10) Patent No.: US 6,366,057 B1
(45) Date of Patent: Apr. 2, 2002

(54) CHARGING METHOD OF RECHARGEABLE BATTERY

(75) Inventor: Toshiyuki Nakatsuji, Osaka (JP)

(73) Assignee: Matsushita Electric Industrial Co. Ltd., Osaka (JP)

( * ) Notice: Subject to any disclaimer, the term of this patent is extended or adjusted under 35 U.S.C. 154(b) by 0 days.

(21) Appl. No.: 09/925,526

(22) Filed: Aug. 9, 2001

(30) Foreign Application Priority Data

Aug. 9, 2000 (JP) ........................................ 2000-241923

(51) Int. Cl.⁷ ............................... H02J 7/04; H02J 7/16
(52) U.S. Cl. ...................................... 320/153; 320/139
(58) Field of Search ............................... 320/150, 153, 320/139

(56) References Cited

U.S. PATENT DOCUMENTS 5,900,718 A * 5/1999 Tsenter ........................ 320/151
6,124,698 A * 9/2000 Sakakibara ................. 320/110

* cited by examiner

Primary Examiner—Gregory Toatley
(74) Attorney, Agent, or Firm—Michael K. Kelly; Snell & Wilmer, LLP (57) ABSTRACT

A charging method of a rechargeable battery includes steps of: charging the rechargeable battery with a constant current; charging the rechargeable battery with a constant voltage or with a current having a pulse waveform; and when a charging current is decreased so as to be equal to or lower than a predetermined current value, or when an average charging current for a single pulse of the current having a pulse waveform is decreased so as to be equal to or lower than a predetermined current value, determining that the rechargeable battery has been fully charged and stopping the charging of the rechargeable battery, wherein a temperature of the rechargeable battery is measured, and the predetermined current value at which the charging of the rechargeable battery is stopped is adjusted according to the measured temperature.

3 Claims, 6 Drawing Sheets

CHARGING METHOD OF RECHARGEABLE BATTERY

BACKGROUND OF THE INVENTION

1. Field of the Invention

The present invention relates to a charging method of a rechargeable battery, such as a lithium ion battery, a lithium polymer battery, or the like.

2. Description of the Related Art

The market of lithium ion batteries or the like has been rapidly expanding because rechargeable batteries, such as, a lithium ion battery or the like, are widely used as power sources in various portable electronic apparatuses, such as, a notebook-type personal computer, a cellular phone, etc.

When charging a lithium ion battery, in view of managing the remaining capacity of the battery, it is important to reduce the variation in the amount of charged electric current in the fully-charged battery.

When charging a lithium ion battery, it is necessary to prevent the battery from being overcharged in view of safety during the charging. Thus, the charging voltage should not be unlimitedly increased. In a charging method of a lithium ion battery illustrated in FIG. 6, CVCC (Constant Voltage, Constant Current) charging control is performed. In the CVCC charging control, in a first step, the lithium ion battery is charged by allowing a constant current to flow between a positive terminal and a negative terminal of the lithium ion battery (constant-current charging: the charging voltage increases with the passage of time). Then, after the voltage between the positive and negative terminals of the lithium ion battery reaches a predetermined voltage value, the lithium ion battery is charged by applying a constant voltage between the positive and negative terminals of the lithium ion battery (constant-voltage charging: the charging current decreases with the passage of time) until the lithium ion battery reaches a fully charged state.

Figure 6:
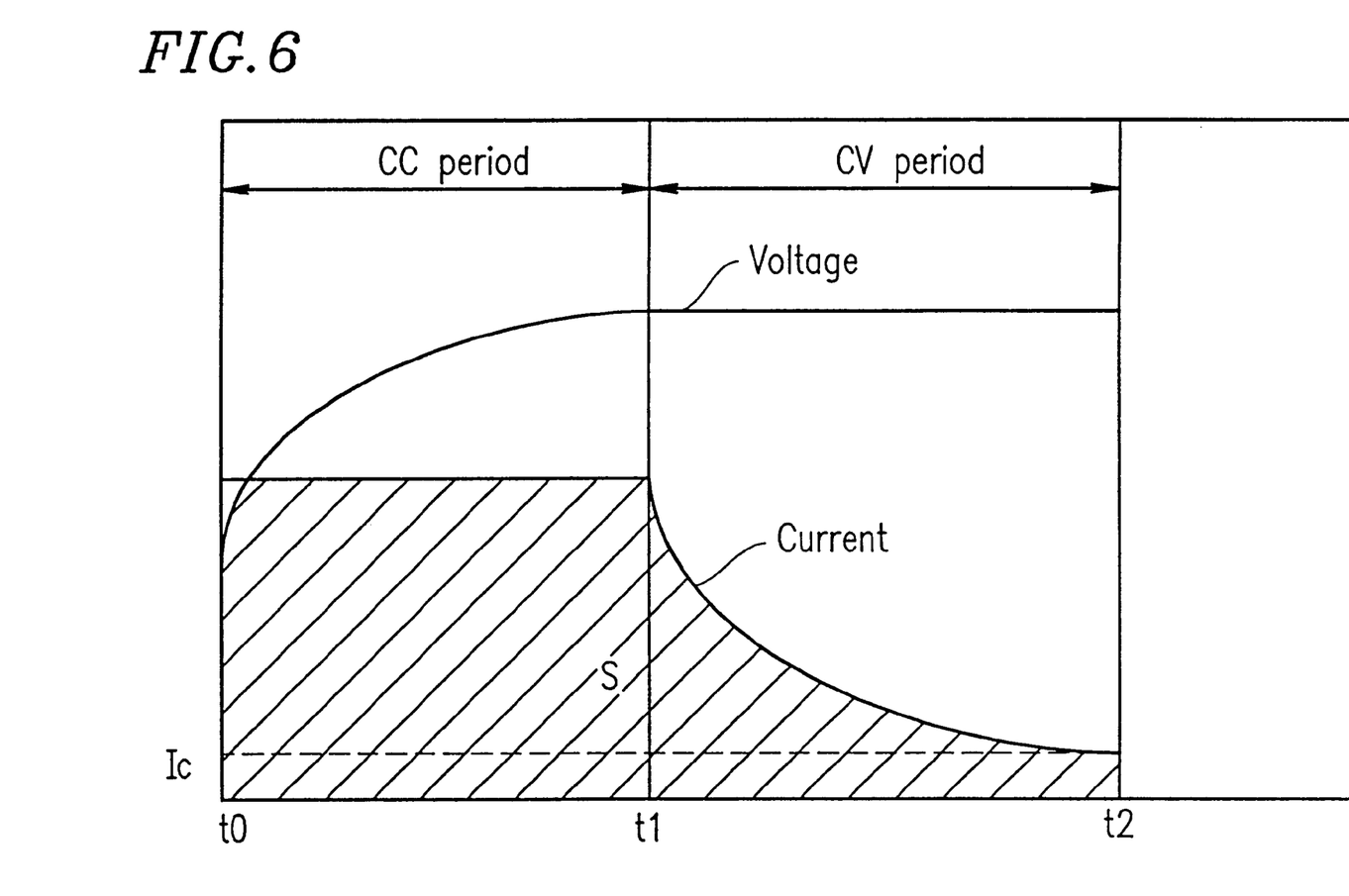
FIG. 6 shows a characteristic curve of a charging current in CVCC charging of a lithium ion battery.

In FIG. 6, during a charging period from time t0 to time t1 (Constant Current (CC) period), the lithium ion battery is charged in a constant-current charging mode. During a charging period from time t1 to time t2 (Constant Voltage (CV) period), the lithium ion battery is charged in the constant-voltage charging mode. During the CC period, the charging current is constant. During the CV period, the charging voltage is constant.

In the CVCC charging control, when charging is complete, the total amount S of charged electric current in the fully-charged lithium ion battery is represented by the total area of the shaded region in FIG. 6 which is enclosed by a characteristic curve of the charging current and the vertical and horizontal axes. When the charging current becomes smaller than a predetermined charging current value Ic during the CV period, it is determined that the lithium ion battery is fully charged, and the charging is stopped. The current value Ic at which the charging is stopped is set so as to be about $\frac{1}{10}$ to $\frac{1}{15}$ of the charging current value employed during the CC period, i.e., 0.07 C (e.g., 100 mA in the case of a battery having a capacity of 1500 mAh).

During the CV period, the shape of the characteristic curve of the charging current always results in substantially the same shape so long as the temperature is maintained at a certain value, while the charging current value decreases with the passage of time. Thus, if the temperature is constant, the total amount S of electric current charged in the lithium ion battery always substantially the same at the end of each charging operation as shown in FIG. 6, i.e., the variation in the total amount S of charged electric current decreases.

Figure 5:
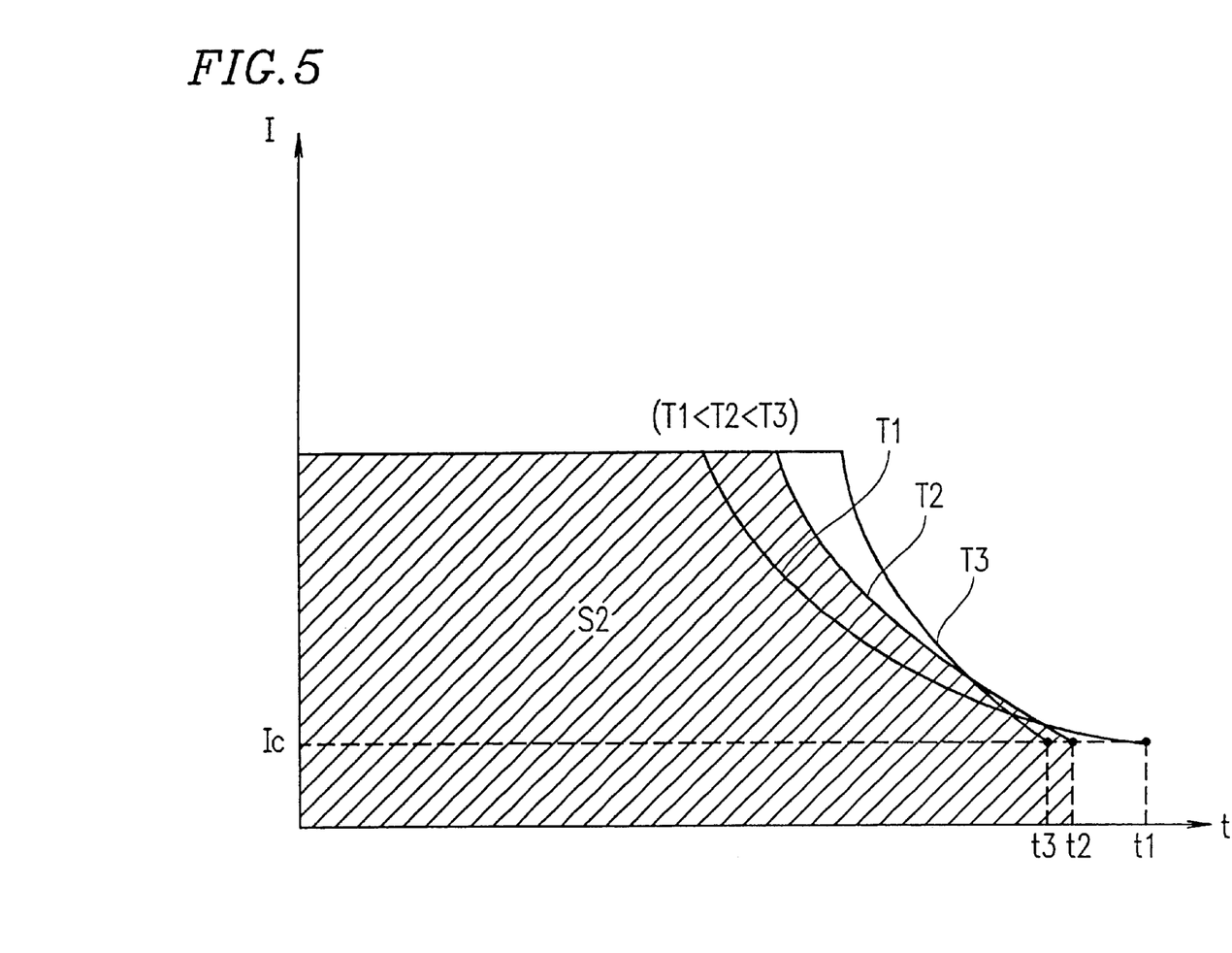
FIG. 5 shows characteristic curves of a charging current for different temperatures of a lithium ion battery.

However, when the temperature of the lithium ion battery varies as shown in FIG. 5, the internal resistance of the lithium ion battery also varies, and accordingly, the shape of the characteristic curve of the charging current for the lithium ion battery is changed. In the case where the current value Ic at which it is determined that the battery is in a fully charged state (hereinafter, "full charge determination current value") is constant, the times at which the lithium ion battery becomes fully charged and the charging operation is completed (hereinafter, "charging completion time") for three different temperatures of the lithium ion battery, T1, T2, and T3 (T1<T2<T3) are t1, t2, and t3 (t3<t2<t1), respectively. That is, as the temperature of the lithium ion battery decreases, the time at which the lithium ion battery becomes fully charged is delayed. In this case, the total amounts of charged electric current, S1, S2, and S3, of the fully-charged lithium ion battery for the temperatures T1, T2, and T3 have a relationship of S1<S2<S3. That is, as the temperature of the lithium ion battery becomes higher, the amount of electric current charged in the lithium ion battery increases. This is due to the fact that, when the temperature of the lithium ion battery is low, the internal resistance of the lithium ion battery is increased, and accordingly, the total amount S of electric current charged in the lithium ion battery is decreased. On the other hand, when the temperature of the lithium ion battery is high, the internal resistance of the lithium ion battery is decreased, and accordingly, the total amount S of electric current charged in the lithium ion battery is increased.

Thus, when c harging the lithium ion battery, if the temperature of the lithium ion battery varies, it is difficult to suppress the variation in the amount of electric current charged in the fully charged battery.

As described above, in the CVCC charging control of the lithium ion battery, the full charge determination current value Ic is maintained at a constant value as shown in FIG. 6 even if the temperature of the lithium ion battery varies. Insucha full charge state detection method, the amount of electric current charged in the battery varies according to the variation of the temperature of the battery. Thus, error may be caused in the management of the remaining capacity of the battery.

SUMMARY OF THE INVENTION

According to one aspect of the present invention, a charging method of a rechargeable battery includes steps of: charging the rechargeable battery with a constant current; charging the rechargeable battery with a constant voltage or with a current having a pulse waveform; and when a charging current is decreased so as to be equal to or lower than a prede termined current value, or when an average charging current f or a single pulse of the current having a pulse waveform is decreased so as to be equal to or lower than a predetermined current value, determining that the rechargeable battery has been fully charged and stopping the charging of the rechargeable battery, wherein, in the step of determining that the rechargeable battery has been fully charged, a temperature of the rechargeable battery is measured, and the predetermined current value at which the charging of the rechargeable battery is stopped is adjusted according to the measured temperature.

In one embodiment of the present invention, in a case where the temperature of the rechargeable battery varies, the predetermined current value is set according to the temperature of the rechargeable battery such that the total amount of electric current charged in the rechargeable battery is always the same for different temperatures of the rechargeable battery upon completion of charging the rechargeable battery.

In another embodiment of the present invention, the predetermined current value is adjusted according to the temperature of the rechargeable battery such that the total amount of electric current charged in the rechargeable battery is always the same upon completion of charging the rechargeable battery.

Thus, the invention described herein makes possible the advantages of providing a CVCC charging method by which, in a charging operation of a lithium ion battery, even when the battery temperature varies, the total amount of electric current charged in the battery is always results the same without fail.

These and other advantages of the present invention will become apparent to those skilled in the art upon reading and understanding the following detailed description with reference to the accompanying figures.

DESCRIPTION OF THE PREFERRED EMBODIMENTS

Hereinafter, an embodiment of the present invention will be described with reference to the drawings.

The present invention is directed to a charging method which is used when a rechargeable battery is charged according to CVCC charging control. A feature of the present invention is to select, according to a temperature of the battery, a full charge determination current value at which the battery will be fully charged and a charging operation will be stopped.

According to the present invention, for the purpose of obtaining a same total amount of electric current in a fully-charged lithium ion battery upon each charging, a charging operation is performed with reference to, for example, Table 1 below which illustrates a specific example of the relationship between a battery temperature and a current value Ic at which the battery is determined to be in a fully charged state. The current value is set for each temperature range as follows: Ic=100 mA when the temperature is less than 5° C.; Ic=140 mA when the temperature is in a range from 5° C. to 10° C.; Ic=200 mA when the temperature is in a range from 11° C. to 20° C.; Ic=300 mA when the temperature is in a range from 21° C. to 45° C.; and Ic=320 mA when the temperature is in a range from 46° C. to 59° C. As can be seen in Table 1, as the battery temperature increases, the current value Ic increases accordingly.

TABLE 1

| Temperature [° C.] | <5 | 5–10 | 11–20 | 21–45 | 46–59 |
|---|---|---|---|---|---|
| Current [mA] | 100 | 140 | 200 | 300 | 320 |

Figure 3:
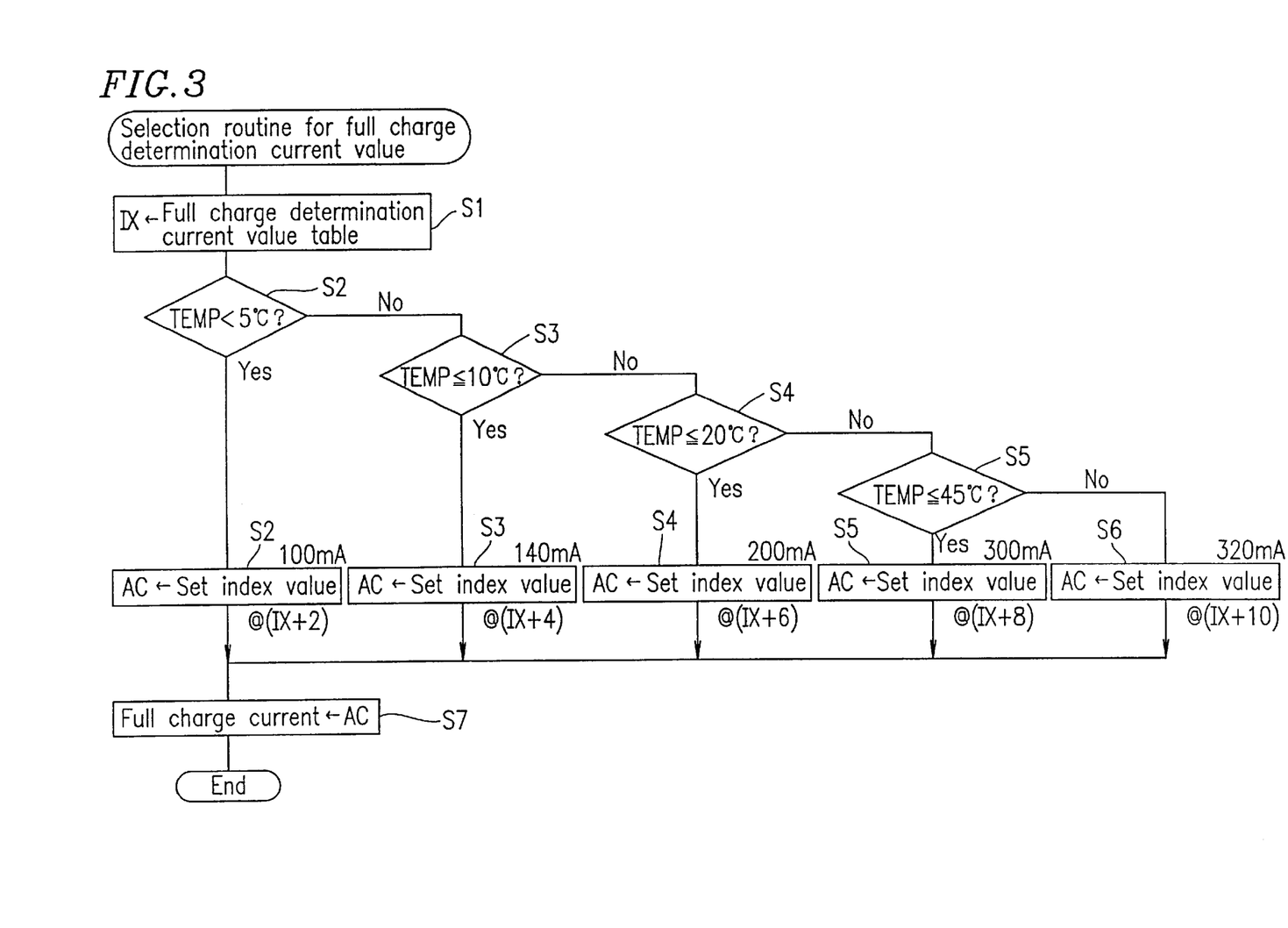
FIG. 3 is a flowchart illustrating a procedure for selecting a full charge determination current value according to an embodiment of the present invention.

FIG. 3 is a flowchart illustrating a procedure for selecting the full charge determination current value Ic for each temperature range. In the first step, the values in a full charge determination current value table (Table 1) are referred to (step S1). Then, the temperature of the lithium ion battery is measured, and a full charge determination current value corresponding to a temperature range including the measured temperature is set as an index value. When the measured temperature is less than 5° C., 100 mA is set as the index value (step S2). When the measured temperature is from 5° C. to 10° C., 140 mA is set as the index value (step S3). When the measured temperature is from 11° C. to 20° C., 200 mA is set as the index value (step S4). When the measured temperature is from 21° C. to 45° C., 300 mA is set as the index value (step S5). When the measured temperature is from 46° C. to 59° C., 320 mA is set as the index value (step S6). Then, the full charge determination current value for full charge processing (which will be described later) is determined for each temperature range (step S7).

Figure 1:
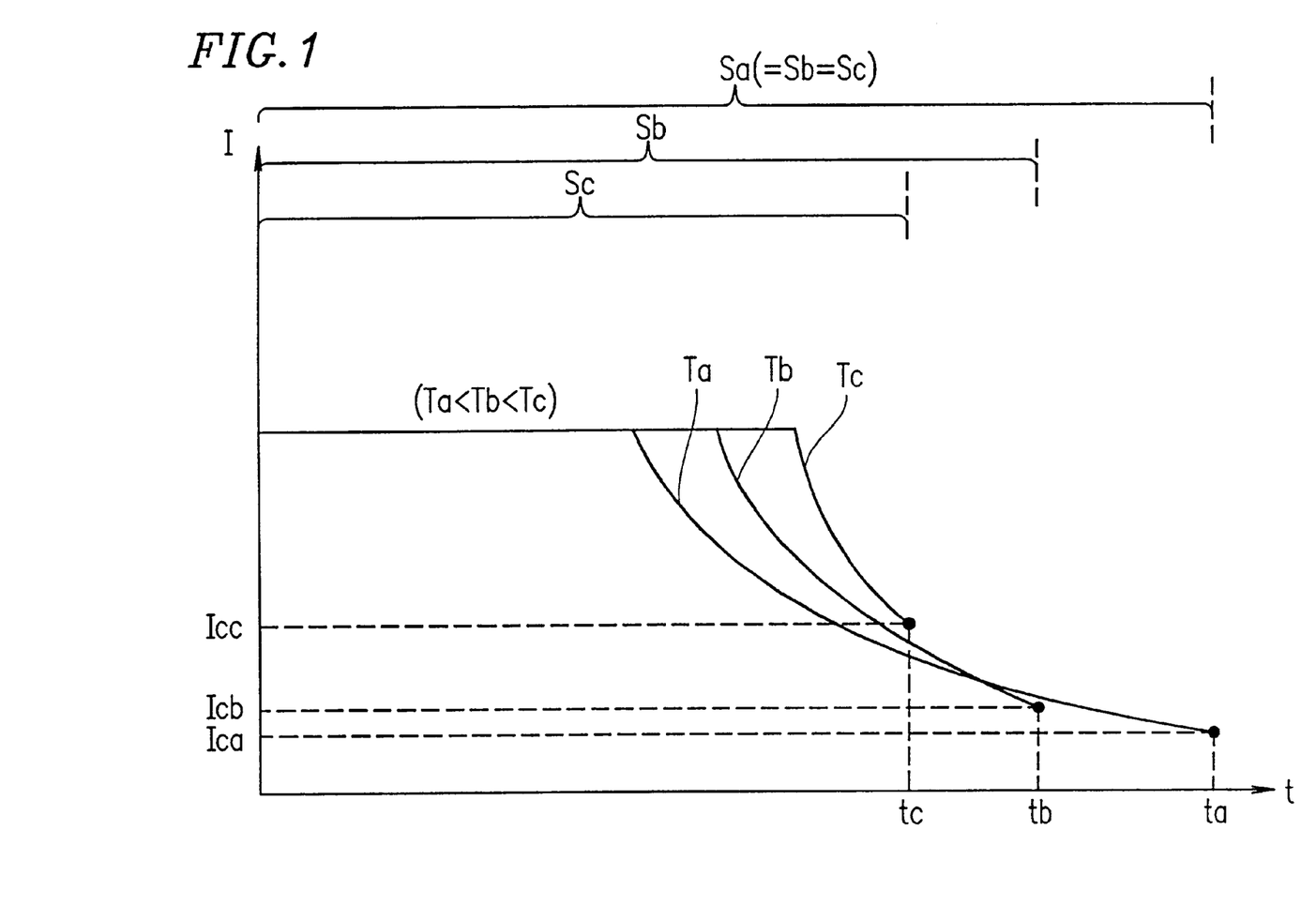
FIG. 1 is a graph illustrating a principle of a charging method of a lithium ion battery according to an embodiment of the present invention.
Figure 2:
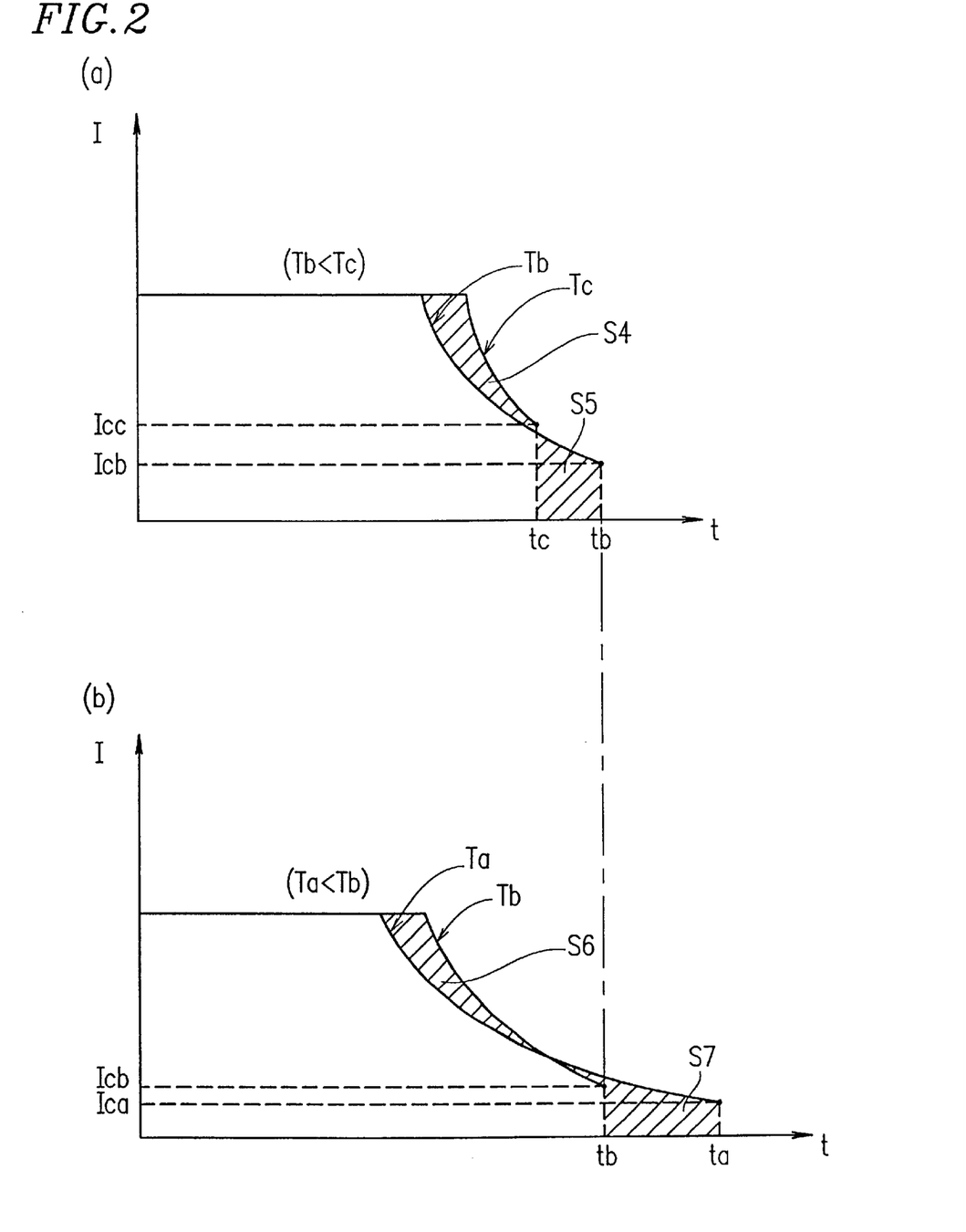
FIG. 2 shows graphs for illustrating a method for determining a full charge determination current value according to an embodiment of the present invention.

FIGS. 1 and 2 are graphs illustrating a principle of a charging method of a lithium ion battery according to this embodiment of the present invention.

Referring to FIG. 2, when the temperature of the battery varies, the full charge determination current value Ic is determined according to a characteristic curve of a charging current for each temperature, whereby the total amount of electric current charged in the battery is the same for different battery temperatures. As shown in part (a) of FIG. 2, when the temperature of the rechargeable battery is higher, the full charge determination current value Ic is set to a larger value. As shown in part (b) of FIG. 2, when the temperature of the rechargeable battery is lower, the full charge determination current value Ic is set to a smaller value.

As shown in part (a) of FIG. 2, for temperature Tc, which is higher than reference temperature Tb (Tb<Tc), the full charge determination current value is set to Icc such that the total amount Sc of electric current charged in the lithium ion battery at temperature Tc is equal to the total amount Sb of electric current charged in the lithium ion battery at reference temperature Tb. In general, the total amount of electric current charged in a lithium ion battery of a certain temperature can be obtained by measuring the total amount of electric current discharged from the fully-charged battery until the battery becomes empty of charge. In part (a) of FIG. 2, the total amount Sb of electric current charged in a lithium ion battery at reference temperature Tb can be obtained by measuring the total amount of electric current discharged from the fully-charged battery until the battery becomes empty of charge. In part (a) of FIG. 2, for reference temperature Tb, the full charge determination current value is Icb and the charging completion time is time tb.

As described above, the shape of the characteristic curve of the charging current is always substantially the same shape so long as the temperature is maintained at a certain value. At temperature Tc (Tb<Tc), if the full charge determination current value is Icb, the total amount Sc of electric current charged in the lithium ion battery at temperature Tc is larger than the total amount Sb of electric current charged in the lithium ion battery at reference temperature Tb. Thus, according to the present invention, when the battery is at temperature Tc (Tb<Tc), in order to satisfy the expression Sb≈Sc, the full charge determination current value Icc and the charging completion time Tc are set so as to satisfy the following expressions (1) and (2):

$$Icb < Icc \tag{1}$$

$$tb > tc \tag{2}$$

Furthermore, in order to satisfy the expression, Sb≈Sc, portions in which the characteristic curves of the charging current for temperatures Tb and Tc (part (a) of FIG. 2) do not overlap with each other must be equal to each other. That is, in part (a) of FIG. 2, areas S4 and S5 must satisfy the following expression (3):

$$S4 \approx S5 \tag{3}$$

Thus, at temperature Tc (Tb<Tc), in order to adjust the total amount Sc of electric current charged in the lithium ion battery at temperature Tc so as to be equal to the total amount Sb of electric current charged in the lithium ion battery at reference temperature Tb, the full charge determination current value Icc for temperature Tc is determined so as to satisfy expressions (1), (2) and (3) based on the total amount Sd of charged electric current obtained by measuring the total amount of electric current discharged from the fully-charged battery until the battery becomes empty of charge.

Referring to part (b) of FIG. 2, for temperature Ta, which is lower than reference temperature Tb (Ta<Tb), the full charge determination current value is set to Ica such that the total amount Sa of electric current charged in the lithium ion battery at temperature Ta is equal to the total amount Sb of electric current charged in the lithium ion battery at reference temperature Tb. In part (b) of FIG. 2, the total amount Sb of electric current charged in a lithium ion battery at reference temperature Tb can be obtained by measuring the total amount of electric current discharged from the fully-charged battery until the battery becomes empty of charge. In part (b) of FIG. 2, for reference temperature Tb, the full charge determination current value is Icb and the charging completion time is time tb.

As described above, the shape of the characteristic curve of the charging current is always substantially the same shape so long as the temperature is fixed to a certain value. At temperature Ta (Ta<Tb), if the full charge determination current value is Icb, the total amount Sa of electric current charged in the lithium ion battery at temperature Ta is smaller than the total amount Sb of electric current charged in the lithium ion battery at reference temperature Tb. Thus, according to the present invention, when the battery is at temperature Ta (Ta<Tb), in order to satisfy the expression Sa≈Sb, the full charge determination current value Ica and the charging completion time ta are set so as to satisfy the following expressions (4) and (5):

$$Ica < Icb \tag{4}$$

$$ta > tb \tag{5}$$

Furthermore, in order to satisfy the expression Sa≈Sb, portions in which the characteristic curves of the charging current for temperatures Ta and Tb (part (b) of FIG. 2) do not overlap with each other must be equal to each other. That is, in part (b) of FIG. 2, areas S6 and S7 must satisfy the following expression (6):

$$S6 \approx S7 \tag{6}$$

Thus, at temperature Ta (Ta<Tb), in order to adjust the total amount Sa of electric current charged in the lithium ion battery at temperature Ta so as to be equal to the total amount Sb of electric current charged in the lithium ion battery at reference temperature Tb, the full charge determination current value Ica for temperature Ta is determined so as to satisfy expressions (4), (5) and (6) based on the total amount Sa of charged electric current obtained by measuring the total amount of electric current discharged from the fully-charged battery until the battery becomes empty of charge.

According to the present invention, the full charge determination current value is adjusted by the above method illustrated in FIG. 2 based on the characteristic curve of the charging current such that the total amount of electric current charged in the battery is the same for charging at different battery temperatures. FIG. 1 is a graph which shows a result of adjustment of the full charge determination current value.

In FIG. 1, for temperatures Ta, Tb and Tc (Ta<Tb<Tc), the total amount of electric current in the fully-charged lithium ion battery is represented by Sa, Sb and Sc, respectively; the full charge determination current value is represented by Ica, Icb and Icc, respectively; and the charging completion time is represented by ta, tb and tc, respectively. When the relationship, Sa≈Sb≈Sc, is satisfied the following expressions (7) and (8) are satisfied:

$$Ica < Icb < Icc \tag{7}$$

$$ta > tb > tc \tag{8}$$

Figure 4:
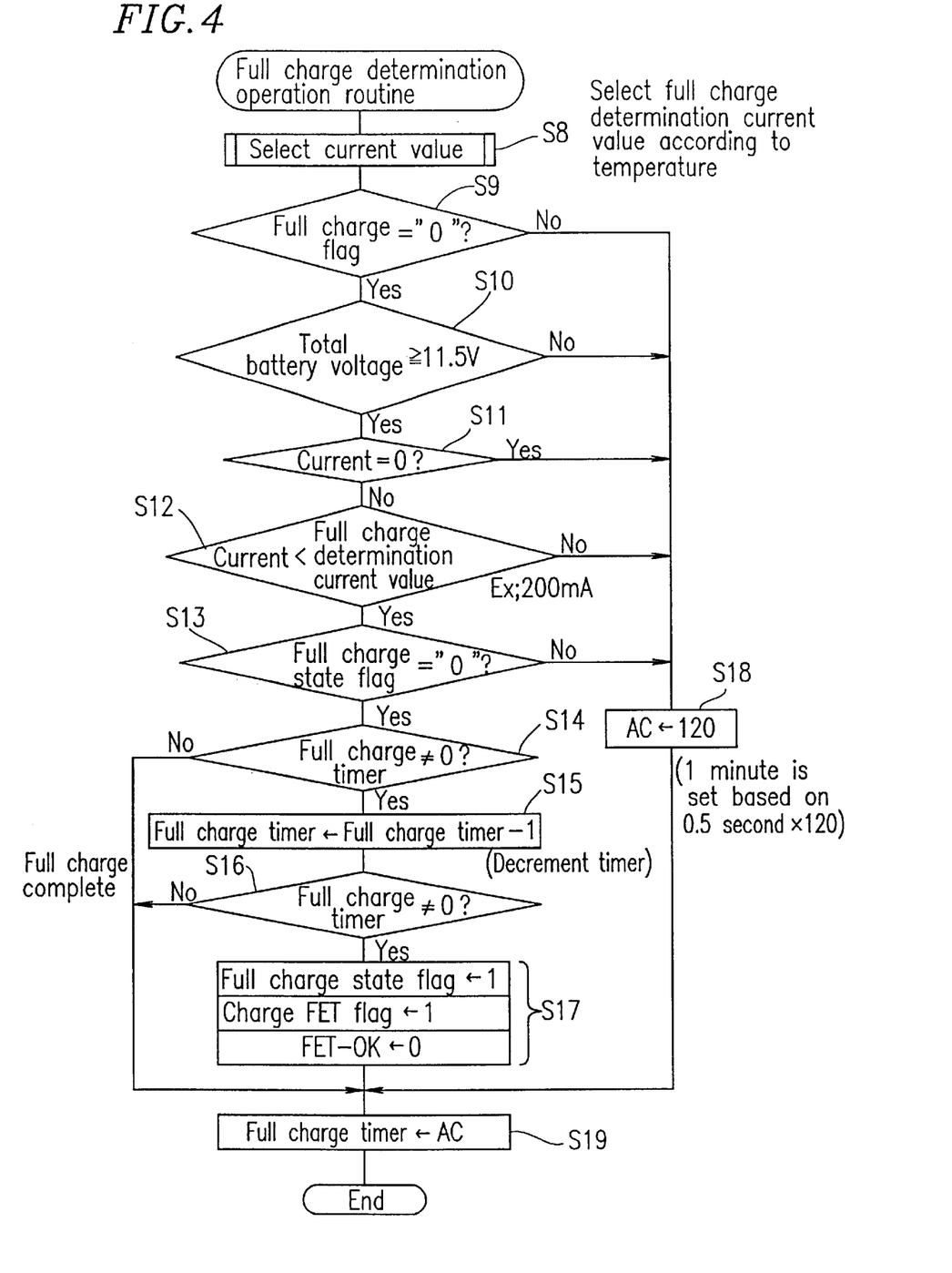
FIG. 4 is a flowchart illustrating a full charge determination operation according to an embodiment of the present invention.

FIG. 4 is a flowchart illustrating a full charge determination operation of the lithium ion battery using the above full charge determination current values. In the full charge determination operation, at the first step, the temperature of the lithium ion battery is measured, and the full charge determination current value corresponding to a temperature range including the measured temperature is selected (step S8). Then, it is determined whether or not a full charge determination is obtained (step S9). If a full charge flag which indicates that the battery has been fully-charged is set, i.e., if not "0" (No at step S9), full charge processing is not performed and a full charge timer is set to one minute, and then, the full charge determination operation ends (step S18). If the full charge flag is not set ("0"), i.e., the lithium ion battery is not yet fully charged (Yes at step S9), the total battery voltage of the lithium ion battery is checked (step Slo) . When the total battery voltage is less than 11.5 V (No at step S10), full charge processing is not performed and the full charge timer is set to one minute, and then, the full charge determination operation ends (step S18).

When the total battery voltage is equal to or greater than 11.5 V (Yes at step S10), the charging current is checked (step S11). If the charging current is 0, i.e., a charging operation is not being performed (No at step S11), full charge processing is not performed and the full charge timer is set to one minute, and then, the full charge determination operation ends (step S18).

When any charging current is being applied to the battery, the value of the charging current is compared with the full charge determination current value (step S12). If the value of the charging current is equal to or greater than the full charge determination current value (No at step S12), it is determined that the charging operation is halfway through. In this case, full charge processing is not performed and the full charge timer is set to one minute, and then, the full charge determination operation ends (step S18). On the other hand, if the value of the charging current is smaller than the full charge determination current value (Yes at step S12), it is determined whether or not the lithium ion battery has been fully charged, i.e., whether a full charge state flag is not set (step S13). If the full charge state flag is not set (Yes at step S13), it is checked whether the value of the full charge timer is not 0 (step S14). If the value of the full charge timer is not 0 (Yes at step S14), the full charge timer is decremented (step S15). Then, it is checked again whether the value of the full charge timer is not 0, i.e., whether the full charge state has lasted for one minute (step S16). If the value of the full charge timer is not 0, it is determined that the full charge state has not lasted for one minute, and then, the above-described full charge determination is repeated for another minute. This continuation of the full charge determination is provided for preventing a full charge determination error which may be caused by an abrupt decrease of electric current due to an increase of noise or an abrupt increase of load. In this example, the full charge determination is continued for another minute, but the continuation time is not limited to one minute. When the value of the charging current has been less than the full charge determination current value for one minute or more, the full charge processing is performed (step 17), and the full charge determination operation is completed (step S19).

In the full charge processing at step S17, the full charge flag is set to 1, a charge FET flag is set to 1, and the charging is completed.

The charging current may be stopped by turning off a FET for charging which is included in a charging control circuit. Alternatively, the charging control circuit may communicate the result of the full charge determination operation to a principal part of a personal computer (PC) which manages a charging operation so that the principal part of the PC stops the charging current. In either case, the full charge determination operation is performed according to the above-described method.

Generally, the full charge determination operation routine is incessantly executed at a predetermined cycle in a main routine. When the above determination conditions are satisfied, full charge processing is performed. Furthermore, when the battery is discharged after the full charge processing is completed, or when the amount of remaining electric current in the battery is reduced to a predetermined amount, the full charge flag returns to 0 (rechargeable point), and the battery becomes chargeable.

In the example illustrated above, the full charge determination current value is selected from predetermined values in Table 1 which correspond to predetermined temperature ranges. However, according to the present invention, the full charge determination current value may be approximately determined by a linear interpolation method so as to correspond to each measured temperature. For example, assume a case where Ic=160 mA when the temperature of the battery is 10° C., and Ic=240 mA when the temperature of the battery is 20° C. The full charge determination current value for the temperature of 14° C. is determined by a linear interpolation method as follows:

$$Ic=160+(240-160)\times(14-10)/(20-10) \text{ mA}=192 \text{ mA}$$

Thus, by employing such a linear interpolation method, determination accuracy in determining the full charge state is improved.

Furthermore, a charging method of a lithium ion battery according to the present invention may be applied to pulse charging which uses PWM (Pulse Width Modulation) control. Generally, there are two pulse charging methods to which the present invention can be applied.

According to the first one of the pulse charging methods, charging of a battery is performed by constant-current charging until the charging voltage reaches a predetermined voltage (on-duty ratio of 100%). Thereafter, pulse cycle of the charging current is fixed to a constant cycle, and the duty ratio is reduced, whereby the average amount of electric current for one pulse of the charging current is reduced. When the average amount of electric current decreases to a predetermined value, the full charge determnination current value at which the charging is stopped is reached. In this case, when the temperature of the battery varies, the full charge determination current value is adjusted according to the. temperature of the battery.

According to the second pulse charging method, charging of a battery is performed by constant-current charging until the charging voltage reaches a predetermined voltage (on-duty ratio of 100%). Thereafter, when the battery voltage of a lithium ion battery reaches a predetermined first control voltage, the charging current is turned off. Then, when the battery voltage decreases to a second control voltage which is lower than the firgt control voltage, the charging current is turned on. When the charging current is turned on, the battery voltage increases. When the battery voltage reaches the first control voltage, the charging current is turned off again. With such a repetition of on/off operation, the waveforms of the charging current and the charging voltage which are applied to the lithium ion battery each result in a pulse waveform. During such pulse charging, when the battery voltage does not decrease to the second control voltage within a predetermined period since the charging current is turned off, it is determined that the battery has been fully charged. In this case, when the temperature of the battery varies, the first and second control voltage values are adjusted according to the temperature of the battery, whereby the pulse width of the charging current (frequency of on/off switching of the charging current) can be changed. As a result, the same effect as that produced by adjusting the full charge determination current value can be obtained.

As described hereinabove, in a charging control method of a rechargeable battery according to the present invention, a current value and a voltage value which are conditions for determining a full charge state are adjusted such that the total amount of electric current in the fully-charged lithium ion battery is always the same even when the battery temperature is varied. Thus, accurate management of remaining battery power can be achieved.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A charging method of a rechargeable battery, comprising steps of:
   charging the rechargeable battery with a constant current;
   charging the rechargeable battery with a constant voltage or with a current having a pulse waveform; and
   when a charging current is decreased so as to be equal to or lower than a predetermined current value, or when an average charging current for a single pulse of the current having a pulse waveform is decreased so as to be equal to or lower than a predetermined current value, determining that the rechargeable battery has been fully charged and stopping the charging of the rechargeable battery, wherein, in the step of determining that the rechargeable battery has been fully charged, a temperature of the rechargeable battery is measured, and the predetermined current value at which the charging of the rechargeable battery is stopped is adjusted according to the measured temperature.

2. A charging method of a rechargeable battery according to claim 1, wherein in a case where the temperature of the rechargeable battery varies, the predetermined current value is set according to the temperature of the rechargeable battery such that the total amount of electric current charged in the rechargeable battery is always the same for different temperatures of the rechargeable battery upon completion of charging the rechargeable battery.

3. A charging method of a rechargeable battery according to claim 1, wherein the predetermined current value is adjusted according to the temperature of the rechargeable battery such that the total amount of electric current charged in the rechargeable battery is always the same upon completion of charging the rechargeable battery.

* * * * *